United States Patent [19]

Gruskin

[11] 4,343,534
[45] Aug. 10, 1982

[54] SIMULATED CAMERA VIEWER FOR VIDEO PRODUCTIONS

[76] Inventor: Kenneth A. Gruskin, 52 Blokland Dr., Longmeadow, Mass. 01106

[21] Appl. No.: 230,521

[22] Filed: Feb. 2, 1981

[51] Int. Cl.³ .................. G02B 5/00; G01C 3/00; G03B 13/12
[52] U.S. Cl. .................... 350/319; 33/277; 354/222
[58] Field of Search ............. 350/319; 354/222, 223

[56] References Cited

U.S. PATENT DOCUMENTS

| | | | |
|---|---|---|---|
| 685,839 | 11/1901 | Heger | 33/277 |
| 2,061,643 | 11/1936 | Wolff | 354/219 |
| 3,981,564 | 7/1976 | Hoos | 354/222 |
| 4,283,860 | 8/1981 | Rucker | 354/222 |

FOREIGN PATENT DOCUMENTS 1297887  5/1962  France .................. 350/319

*Primary Examiner*—Jon W. Henry
*Attorney, Agent, or Firm*—Leonard S. Michelman

[57] ABSTRACT

This invention is concerned with a device for simulating the view of a television or movie camera to assist the technical picture taker in selecting the size of the frame of the scenes to be viewed. There is a front opening which can be changed by inserting frames of different size openings into a slot above the opening. There is a rear opening adapted to permit the eye of the camera technician to look therethrough. A storage compartment is located below the viewing area for storing the various frames having different size openings. A handle assembly is located beneath the front lower portion to enable the technician to hold the viewer while he is looking through it to determine the frame size desired.

8 Claims, 7 Drawing Figures

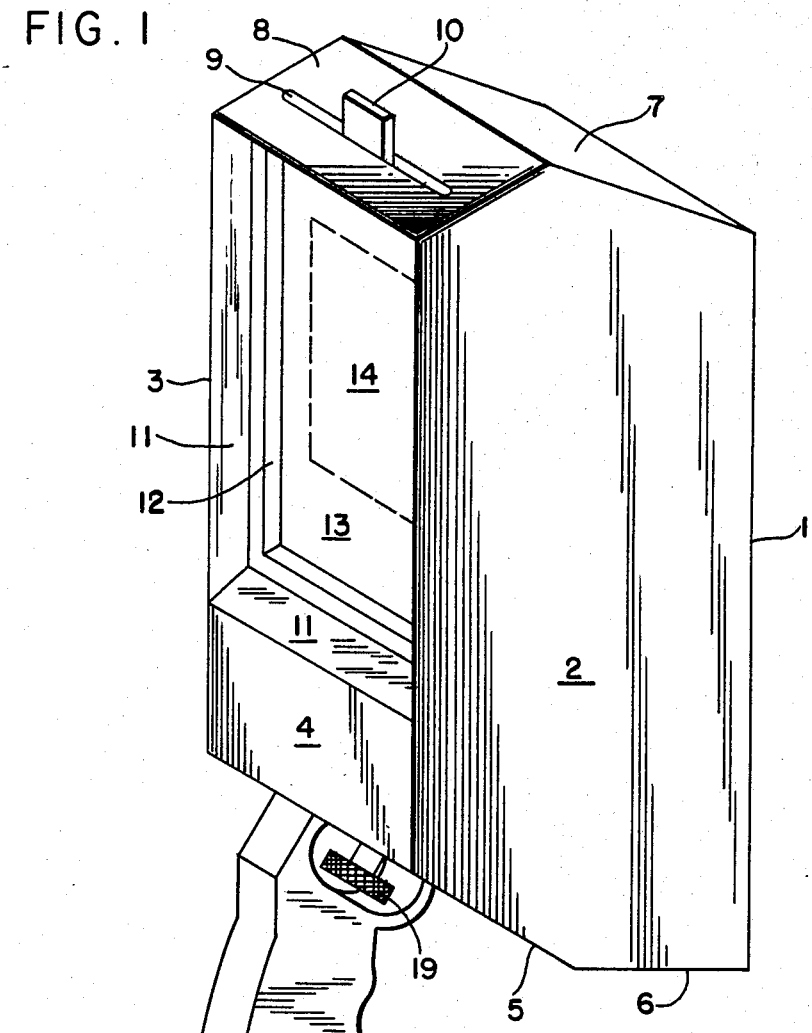
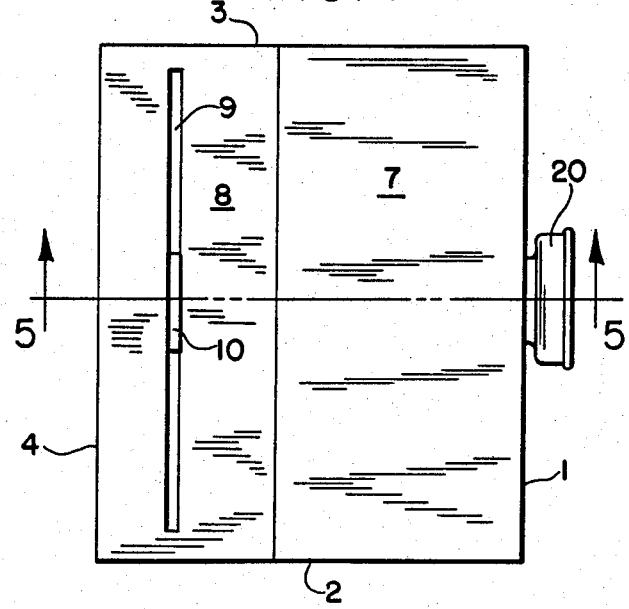

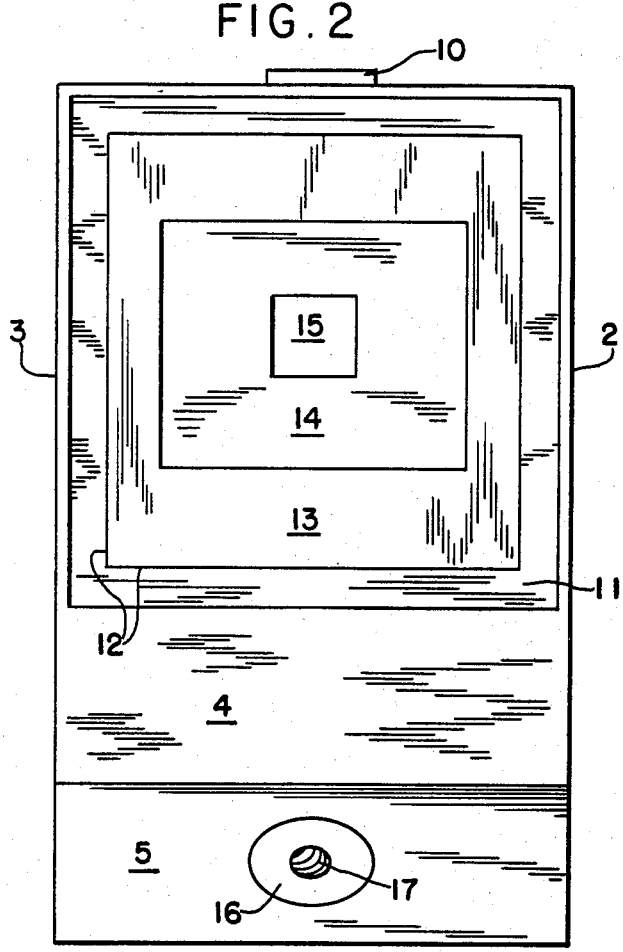
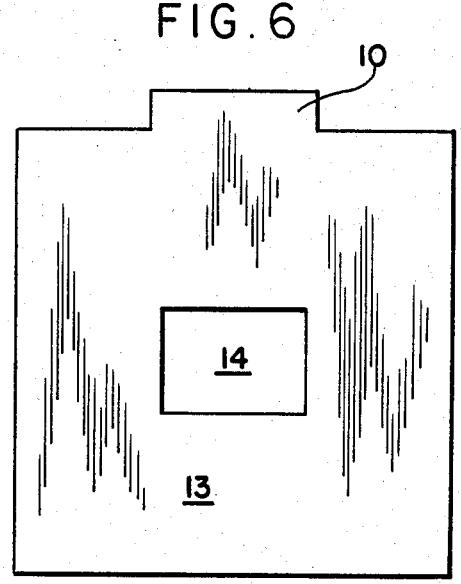
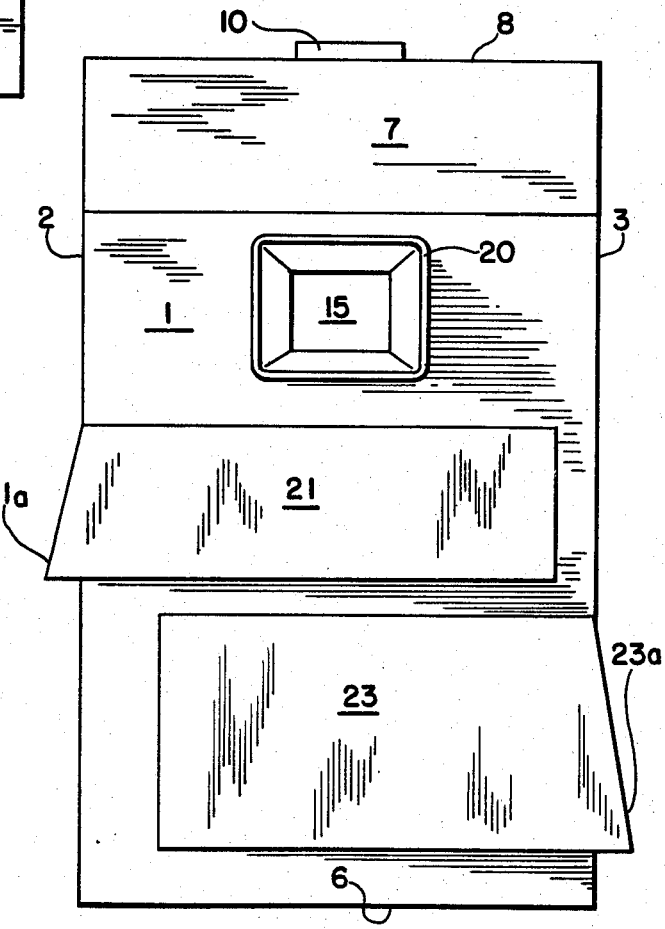
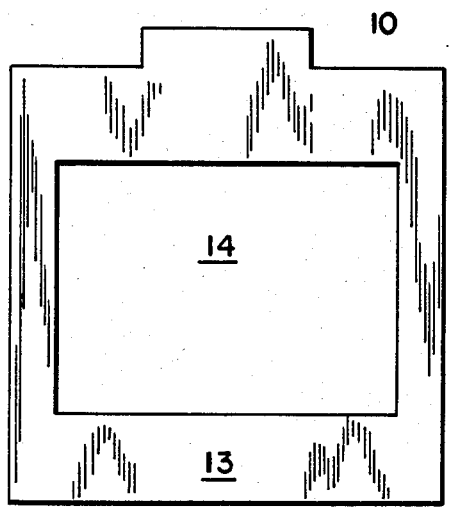

SIMULATED CAMERA VIEWER FOR VIDEO PRODUCTIONS

This invention is concerned with a new concept and article of manufacture for viewing for video productions scenes that are to take place for either television viewing or for movie making.

Prior to the conception of the within invention, most television and movie productions have been made by a trial and error on the part of the director and the film taker, and mostly by instinct.

The purpose of the within invention is to provide a method for determining closeups, size of the frame, and the amount of detail to be included in the frame of the scene or picture.

It is a principal object of the within invention to provide an article of manufacture that will eliminate the requirement of using technical people during a rehearsal and a preliminary setup, as well as the elimination of using film (which has now become very expensive) until the final taking.

It is yet another object of this invention to provide an article of manufacture for one who is producing a video or film to frame the sizes of the pictures and closeups which he selects by simulated methods.

It is another object of the within invention to provide an article of manufacture whereby the framing of the picture may be changed with variables whereby changing the framing in the viewer, greater or less details may be included in the scope and area of the scene to be taken.

It is an additional object of the within invention to provide an article of manufacture which is self-contained in that the variable sizes of the frames which will cut out or increase the size of the picture to be taken, are conveniently located in a storage compartment.

It is a further object of the within invention to provide a lightweight, simple, portable simulated viewer for video productions that is inexpensive in the cost of manufacture and simple to use.

For a more complete explanation of the within invention, reference is made to the following detailed specification, description, and the drawings, in which:

FIG. 1 is a front perspective view of the scene viewer.

FIG. 2 is a front elevation view of the scene viewer.

FIG. 3 is a rear elevation view of the scene viewer.

FIG. 4 is a top plan view of the scene viewer.

FIG. 6 is a front elevational view of an insertable frame which has a small opening.

FIG. 7 is a front elevational view of a screen which has a larger opening than the frame of FIG. 6.

Figure 5:
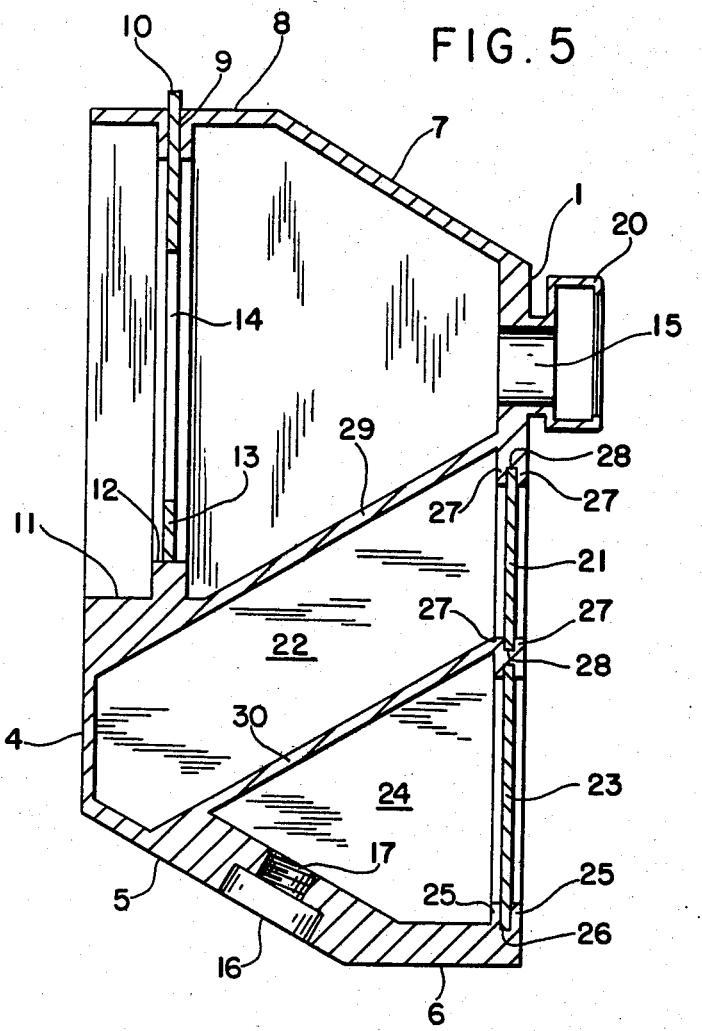
FIG. 5 is a diagramatic cross-section view of the scene viewer shown in the view of FIG. 4, along line 5—5.

The rear 1 of the viewer is shown in the various figures of the drawing. The right side 2 of the viewer and the left side 3 of the viewer can be seen in the views of FIGS. 1 and 3.

The lower front 4 of the viewer is beneath the recessed area 11 which is in front of the insert 13 and the support frame 12 for the frame insert 13. These details can be seen clearly in the views of FIGS. 1 and 2.

In the view of FIG. 1 as well as in the sectional view of FIG. 5, the diagonal lower front 5 is located beneath 4 and above the bottom 6 of the viewer. The top rear 7 of the viewer lies between the rear 1 and the top 8. In the top 8, perpendicular to the sides 2 and 3, there is a slot 9 which is sufficiently wide enough to enable the insert 13 to be dropped down therein so as to rest on the support 12. Each insert 13 has a tab 10 at the top thereof so that same may be dropped into or removed from the said slot 9.

Inside of the recessed area 11, the protrusion design of the support frame 12 acts as a shield to seal off the light when the insertable frame 13 is in position within the slot 9. The support frame 12 is aligned with the slot 9 so that the insertable frame 13 rests thereon.

In the central area of the insertable frames 13 there is a rectangular opening 14. In the view of FIG. 6 there is shown an insertable frame 13 with a small opening 14; in the view of FIG. 7, there is shown an insertable frame 13 with a larger opening 14. The invention has been designed so that the insertable frames 13 have a plurality of openings of variable sizes 14. For simplicity, only two species of such insertable frames appear in the drawing. There are at least ten insertable frames with different size openings so that that operation of the viewer, for the purposes hereinafter explained, will be versatile and efficient.

Reference is made to the views of FIGS. 3 and 5. In the rear of the viewer on the surface 1 is a rear opening (eye sighter) 15. There is an eye sighter member 20 circumscribing the opening 15. In order to support the viewer and make it easier to hold it up to one's eye, there has been mounted at the bottom of the diagonal lower front 5, a mechanical arrangement including a sleeve 16 in which there are threads 17. Inserted into the opening in which the threads 17 are located is the handle assembly 18. There is a screw lock mechanism 19 which meshes with the threads 16 and locks the handle into the position as shown in the view of FIG. 1. The handle 18 enables the user to hold the viewer and place the opening eye sighter 15 up to one of his eyes, in a secure position.

The invention described includes certain other features for the purposes of storage and convenience. In the rear view FIG. 3, there is a sliding door 21. In the view of FIG. 5 there are two compartment dividers 29 and 30. The dividers 29 and 30 are flat members secured to the front 4 and lower front 5, and the sides 2 and 3 as shown in the view of FIG. 5. The slide door 21 is moveably located between the bifurcated frame 27 in the runner groove 28 in the storage compartment 22. Similarly, the sliding door 23 is moveably mounted between the bifurcated frame 25 and inserted in the runner groove 26 in the lower storage compartment 24.

It is to be noted that in the design of the doors there is an extending portion at 21a (FIG. 3) whereby it is only necessary to slide the door 21 by pulling at 21a in the left direction of FIG. 3 in order to open the upper compartment 22.

In the upper compartment 22, because of its size, the dimensions of the insert members 13 are permitted to be placed therein in a diagonal position. As a result thereof, sufficient of the insertable frame members 13, having different central area size openings 14, can be stored; and therefore, when the operator desires to change to different size frames, it is simple to slide the back door 21 by pulling at 21a and take out from the compartment 22 the desired insertable frame 13.

The lower compartment 24 functions the same way and has been designed for miscellaneous use to store colored transparencies to insert over the openings and other various and miscellaneous items.

There is similarly a protrusion 23a on the slideable door 23 which functions in the same way as the protrusion 21a on the door 21 enabling the user to slide the door 23 in the right handed direction of FIG. 3 in order to insert or remove the items stored in the compartment 24.

In operation the video viewer herein described will be used by the technical people who are staging and directing the video scene, whether used for television and/or movie making. For example, if a scene is to be shown and a closeup is desired then they will hold up the viewer so that one of their eyes is looking through the opening 15 in FIG. 3. They will place in the slot 9 a smaller sized central opening 14 in the insertable frame 13. If they decide they are not receiving enough details, they will change the size 14 of the frame by placing a different frame 13 in the slot 9 with a larger opening 14. They will keep trying this method until they have a frame size that they desire. They will be standing in a position where the camera is to be located, and the actors or subject matter which is being viewed will be in a fixed general area. Therefore, they will move back and forth and change the size of the frame opening 14 in order to bring into the view the desired details of the scene. By using this method, they can keep a log or written notes of what size screen openings they want to use, and therefore, will correlate this information to the camera lens which is going to be used to take the actual picture, subsequently.

The screen or insertable frames 13 with the openings 14 are correlated to lenses used with the camera when the actual film or tape is being taken. A subject can move in any direction, and the frames 13 can be changed as these movements take place. This invention assists the making of tapes or direct viewing for television and movies, since the frames 13 with their openings 14 are compatable with the camera lenses. By using this viewing device, great expense will be saved and the trial and error methods with the time wasted will be eliminated.

In consideration of the foregoing, I claim:

1. A viewer for simulating a camera having a front, a rear, a top, two sides, and a bottom, an opening in the front, a slot in the top parallel to the front opening, an opening in the rear, means circumscribing the opening in the rear whereby a person may place one of his eyes in front of said opening, a plurality of frame members, having a tab holder at the top thereof, each of said frame members having openings therein of a different size from the other frame members whereby when a frame member is placed in the slot in the top, it changes the size of the said opening in the front.

2. A viewer for simulating a camera as described in claim 1 having a frame support means, a recessed area slightly to the rear of the front, said frame support means being located in said recessed area and in alignment with the slot in the top whereby the frame member that is placed in the slot rests on said support means, and light is prevented from passing around the perimeter of said frame member.

3. A viewer as described in claim 1 wherein the front has a lower diagonal plane surface in contact with the bottom surface, a handle assembly, means in said diagonal plane surface for securing said handle assembly to said viewer.

4. A viewer as described in claim 2 wherein the front has a lower diagonal plane surface in contact with the bottom surface, a handle assembly, means in said diagonal plane surface for securing said handle assembly to said viewer.

5. A viewer as described in claim 3 having a first flat member within the viewer secured to the front beneath the opening and to the rear, and having a second flat member secured between the front diagonal surface and the rear, and parallel to the first flat member, whereby two storage compartments are formed within the viewer below the first and rear openings.

6. A viewer as described in claim 4 having a first flat member within the viewer secured to the front beneath the opening and to the rear, and having a second flat member secured between the front diagonal surface and the rear, and parallel to the first flat member, whereby two storage compartments are formed within the viewer below the first and rear openings.

7. A viewer as described in claim 5 having an opening in the rear of the viewer between the first flat member and the second flat member, groove means at the top and bottom of said opening, a panel located in said groove means whereby said panel may be moved so as to open the rear of said compartment and whereby the frame members may be stored therein.

8. A viewer as described in claim 6 having an opening in the rear of the viewer between the first flat member and the second flat member, groove means at the top and bottom of said opening, a panel located in said groove means whereby said panel may be moved so as to open the rear of said compartment and whereby the frame members may be stored therein.

* * * * *